United States Patent [19]

Fischer

[11] Patent Number: 5,032,046

[45] Date of Patent: Jul. 16, 1991

[54] THREADED BOLT ASSEMBLY TO BE ANCHORED IN A DRILLED HOLE WITH AN UNDERCUT AND A METHOD OF ANCHORING THE SAME

[75] Inventor: Artur Fischer, Waldachtal, Fed. Rep. of Germany

[73] Assignee: fischerwerke Artur Fischer GmbH & Co. Kg., Waldachtal/Tumlingen, Fed. Rep. of Germany

[21] Appl. No.: 546,437

[22] Filed: Jun. 29, 1990

[30] Foreign Application Priority Data

Jul. 1, 1989 [DE] Fed. Rep. of Germany ....... 3921697

[51] Int. Cl.⁵ ............................................. F16B 39/02
[52] U.S. Cl. ........................................ 411/82; 411/55; 405/261
[58] Field of Search ................. 411/29, 54, 55, 60, 411/82, 258; 405/260, 261

[56] References Cited

U.S. PATENT DOCUMENTS

| 4,475,329 | 10/1984 | Fischer. |
| 4,904,134 | 2/1990 | Fischer .................. 411/54 |
| 4,943,195 | 7/1990 | Fischer .................. 411/54 |

FOREIGN PATENT DOCUMENTS

| 0314912 | 5/1989 | European Pat. Off. ............. 411/54 |
| 2909749 | 9/1980 | Fed. Rep. of Germany. |
| 3209018 | 9/1983 | Fed. Rep. of Germany. |
| 3538995 | 5/1987 | Fed. Rep. of Germany ........ 411/82 |
| 3737549 | 5/1989 | Fed. Rep. of Germany. |
| 216072 | 11/1984 | German Democratic Rep.. |

OTHER PUBLICATIONS

Europäische Patentanmeldung, Inv.: Artur Fischer, 87111741.2, filed Aug. 13, 1987.
Europäische Patentanmeldung, Inv.: Artur Fischer, 86106085.3, filed May 2, 1986.

*Primary Examiner*—Neill R. Wilson
*Attorney, Agent, or Firm*—Michael J. Striker

[57] ABSTRACT

A threaded bolt assembly adapted to be anchored in a drilled hole formed in a concrete part and having an undercut expanding towards a bottom of the drill hole, with a hardening compound mass. The threaded bolt assembly includes a threaded bolt having an internal bore extending from a leading end face of said threaded bolt and having an internal thread, and a plurality of expansible segments formed in a region of the internal bore by a plurality of longitudinally extending slots. The threaded bolt assembly further includes an expander bolt having a threaded portion threadably received within the internal bore of the threaded bolt, an expander cone extending from the threaded portion. A projection extends from an end face of the expander cone.

A method for anchoring such a threaded bolt assembly in a hole with an undercut drilled in a concrete part, is also described.

4 Claims, 1 Drawing Sheet

THREADED BOLT ASSEMBLY TO BE ANCHORED IN A DRILLED HOLE WITH AN UNDERCUT AND A METHOD OF ANCHORING THE SAME

BACKGROUND OF THE INVENTION

The invention relates to a threaded bolt assembly to be anchored in a drilled hole having an undercut and formed in a concrete part, with a hardening compound mass.

Anchoring of a threaded bolt assembly in a drilled hole with a hardening compound mass is disclosed in DE-OS 35 16 866. In the DE-OS 35 16 866, the threaded bolt has, at its leading end face a tapered enlargment, the largest external diameter of which is somewhat smaller than the diameter of the drilled hole for insertion through the cylindrical part of the drilled hole. Thus, the anchoring effect of this threaded bolt is based exclusively on the shear action of the hardened compound mass. In uncracked concrete, this shear action is sufficient to achieve high fixing values, but when such an anchorage is effected in the tension zone of a concrete part, where cracks running through the fixing point may occur as a result of tensile stresses after the fixing elements have been anchored, the compound mass becomes detached from the wall of the drilled hole. A threaded bolt set in a purely cylindrical drilled hole is therefore unable to accommodate any further holding forces. In the case of the threaded bolt according to the DE-OS 35 16 866, the same effect is admittedly produced for the anchorage in the region of the cylindrical part of the drilled hole. However, in the region of the undercut, a matching fit is obtained, which prevents a total failure of the holding force. Certainly the holding force is based exclusively on the shear strength of the compound mass in the region of the undercut, but the latter is considerably less than the resistance to fracture of the concrete.

SUMMARY OF THE INVENTION

The object of the invention is a threaded bolt assembly to be anchored with a compound mass during anchorage of which the decrease in the holding or fixing force is avoided or substantially reduced if cracks in the concrete part occur.

The object of the invention is achieved by providing a threaded bolt assembly having a longitudinal bore extending from a leading end face of the threaded bolt and having an internal thread, and a plurality of expansible segments formed in a region of the longitudinal bore by a plurality of longitudinally extending slots. An expander bolt having a threaded portion is threadably received within the bore of the threaded bolt. The expander bolt includes an expander cone extending from the threaded portion, and a projection extending from an end face of the expander cone.

By virtue of these features, the anchoring effect of the threaded bolt according to the invention is based on the combination of a compound mass and undercut anchorage system. In uncracked concrete, because of the high adhesive strength of the compound mass, a very high withdrawal force is produced over the entire length of the drilled hole without expansion pressure, which allows minimum edge and axis spacings. Because it is additionally possible to expand the threaded bolt so that the undercut is largely filled, a mechanical matching fit is achieved which, purely on the basis of the matching fit, allows the withdrawal force to exploit the bearing capacity of the concrete to the full. In the event of the compound mass becoming detached from the wall of the drilled hole because of the drilled hole having been widened as a result of cracks, there is no substantial decrease in the holding force.

The roof-shaped projection arranged at the end face of the expander cone serves to break a container for the compound mass and mix a two-component compound mass with which a glass container or ampoule is filled. As soon as the expander bolt rests on the bottom of the drilled hole, the cutting edge of the projection cuts into the bottom of the drilled hole and stops the rotary movement of the expander bolt caused by the expander bolt being carried with the threaded bolt. Further rotation of the threaded bolt results in it being screwed onto the stationary expander bolt so that the expansible segments are pushed over the expander cone of the expander bolt into the undercut of the drilled hole.

As a measure to improve the non-rotation of the expander bolt as it rests at the bottom of the drilled hole, the end edge of the expander bolt can be provided with a knurled rim.

To ensure that the expander bolt rotates with the threaded bolt to break the compound ampoule and to mix the compound mass, between the threaded portion and the expander cone of the expander bolt, there is arranged a collar which, at the expander cone, forms a shoulder against which the expansible segments of the threaded bolt abut.

To rotate the threaded bolt, at its rearward end face there is provided means to be engaged with a turning tool.

The present invention both as to its construction so to its method of operation, together with additional objects and advantages thereof, will be best understood from the following detailed description of specific embodiments when read in connection with the accompanying drawings.

DETAILED DESCRIPTION OF THE PREFERRED EMBODIMENT

Figure 1:
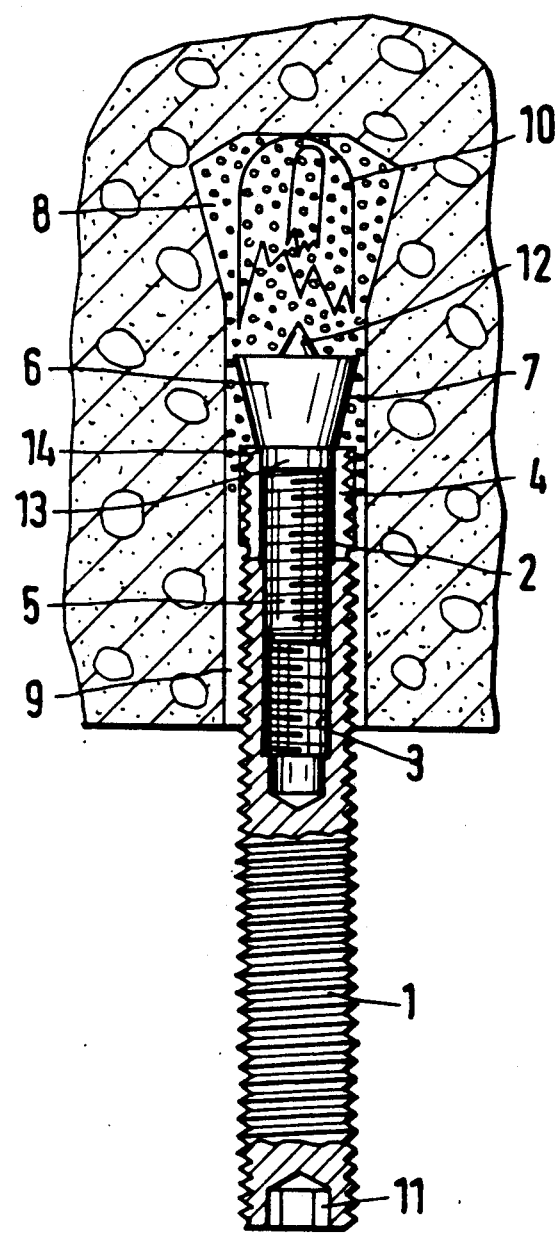
FIG. 1 is a cross-sectional view showing an intermediate stage of anchoring a threaded bolt assembly according to the invention in a drilled hole having an undercut.
Figure 2:
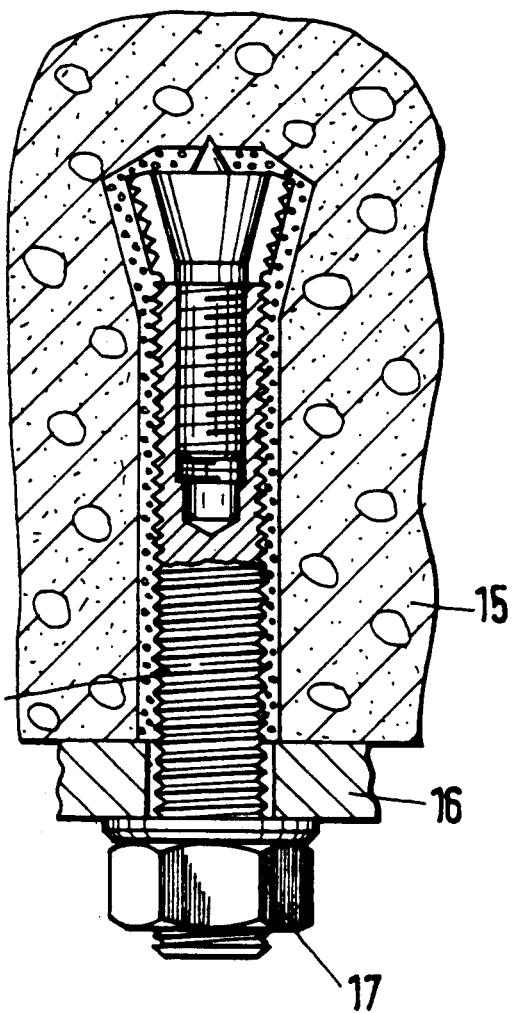
FIG. 2 is a cross-sectional view showing the threaded bolt assembly according to the invention already anchored in the drilled hole.
Figure 3:
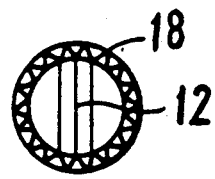
FIG. 3 is a top view of the edge of the expander cone.
Figure 4:
FIG. 4 is a partial elevational view showing a portion of the expander cone with a knurled edge.

The threaded bolt assembly according to the invention and shown in FIGS. 1 and 2 comprises a threaded bolt 1 having an internal bore 2 extending from a leading end face of the threaded bolt 1 and provided with an internal thread 3. The threaded bolt 1 further has at the leading end thereof, expansible segments 4 formed by longitudinal slots. The threaded bolt assembly further comprises an expander bolt 6 having a threaded portion 5 received in the bore 2 with the thread 3, and an expander cone 7. The expander cone 7 has a free end face with an edge provided with a knurled rim. Upon longitudinal displacement of the threaded bolt 1 along the expander bolt 6, the expansible segments 4 of the threaded bolt expand over the expander cone 7 of the expander bolt 6.

To anchor the threaded bolt assembly in the drilled hole 9 having an undercut 8, and formed in a concrete part, a glass ampoule 10 filled with a two-component compound mass, is placed in the bore 9. With a turning tool (not shown) that is inserted into a hexagonal bore provided in the rear end face of the threaded bolt 1, and is secured in a chuck of a hammer drill (not shown), the threaded bolt 1 together with the expander bolt 6 received therein is advanced into the drilled bore 9 upon actuation of the turning tool. Due to engagement of the threaded portion 5 with the thread 3 of the bore 2 of the threaded bolt 1, the expander bolt 6 advances together with the threaded bolt 1. Upon advancement, a roof-like projection 12 extending from an end surface of the expander bolt 6 breaks the ampoule 10. This initiates mixing and flow of the compound mass, and the hardening process begins.

The expander cone 7 has a collar 13 forming a shoulder 14 thereon. The end surfaces of the expansible segments 4 of the threaded bolt 1 abut the shoulder 14. Thereby a resistance to relative displacement of the threaded bolt 1 relative to the expander bolt 6 is provided during advancement of the threaded bolt 1 into the drilled bore 9, and it is insured that the expander bolt 6 rotates together with the threaded bolt 1.

When the cutting edge of the projection 12 reaches the bottom of the drilled hole, rotation of the expander bolt 6 abruptly stops. Upon further rotation of the drill hammer, the threaded bolt 1 is screwed over the threaded portion 5 of the expander bolt 6, and the expansible segments 4, after overcoming the resistance provided by the shoulder 14, expand over the expander cone 7. During this expansion, the compound mass located in the undercut 8 is displaced and completely fills the clearance between the threaded bolt 1 and the walls of the drilled hole 9. Upon hardening of the compound mass, the bolt assembly is securely anchored in the drilled hole 9 as shown in FIG. 2. Then, an article 16 is secured on the portion of the threaded bolt 1 projecting above a surface of a concrete part 15, with a nut 17.

While the invention has been illustrated and described as embodied in a threaded bolt assembly, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A threaded bolt assembly to be anchored in a drilled hole formed in a concrete part and having an undercut expanding towards a bottom of the drill hole, with a hardening compound mass, said threaded bolt assembly comprising a threaded bolt having an internal bore extending from a leading end face of said threaded bolt and having an internal thread, and a plurality of expansible segments formed in a region of said longitudinal bore by a plurality of longitudinally extending slots; and an expander bolt having a threaded portion threadably received within said internal bore of said threaded bolt, an expander cone extending from said threaded portion, and a projection extending from an end face of said expander cone, said end face having an edge provided with a knurled rim.

2. A threaded bolt assembly as set forth in claim 1, wherein said projection has a roof-like shape.

3. A threaded bolt assembly as set forth in claim 1, wherein said expander bolt has a collar arranged between said expander cone and said threaded portion and defining a shoulder, said expansible segments of said threaded bolt having end faces engageable with said shoulder.

4. A threaded bolt assembly as set forth in claim 1, wherein said threaded bolt has a rear end face and hexagonal opening provided in said rear end face and engageable with a turning tool.

* * * * *